May 25, 1937.  C. C. FARMER  2,081,662
RAILWAY VEHICLE CONTROL APPARATUS
Filed Jan. 23, 1934  4 Sheets-Sheet 1
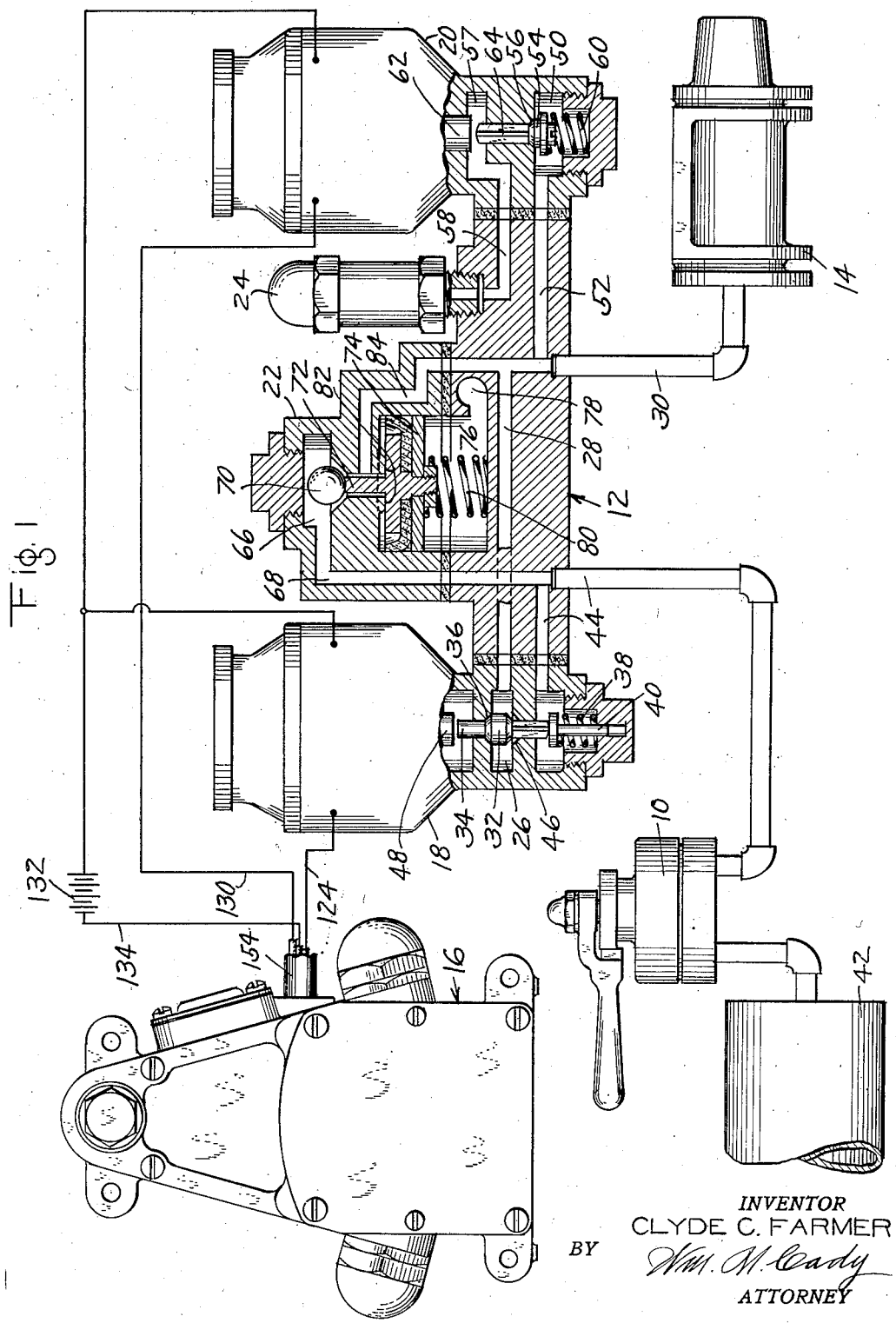
INVENTOR
CLYDE C. FARMER
BY Wm. M. Cady
ATTORNEY

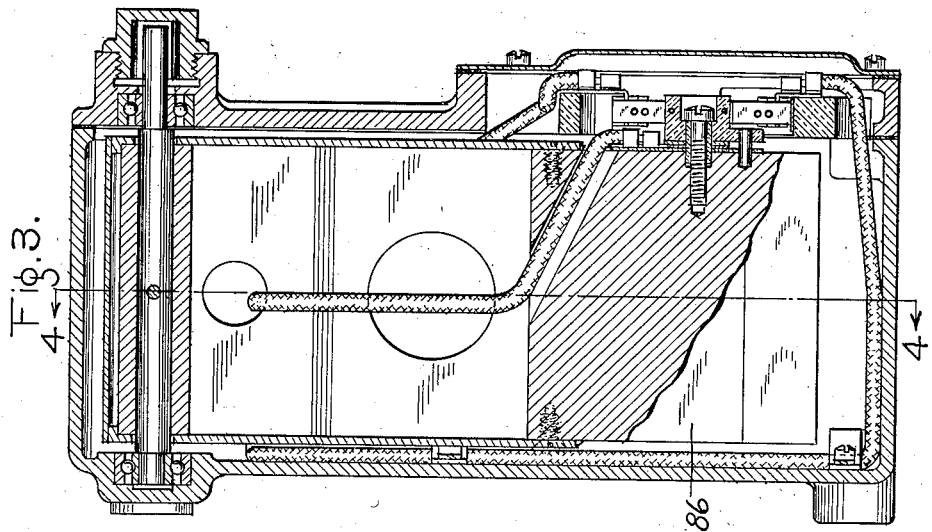

May 25, 1937.  C. C. FARMER  2,081,662
RAILWAY VEHICLE CONTROL APPARATUS
Filed Jan. 23, 1934   4 Sheets-Sheet 3
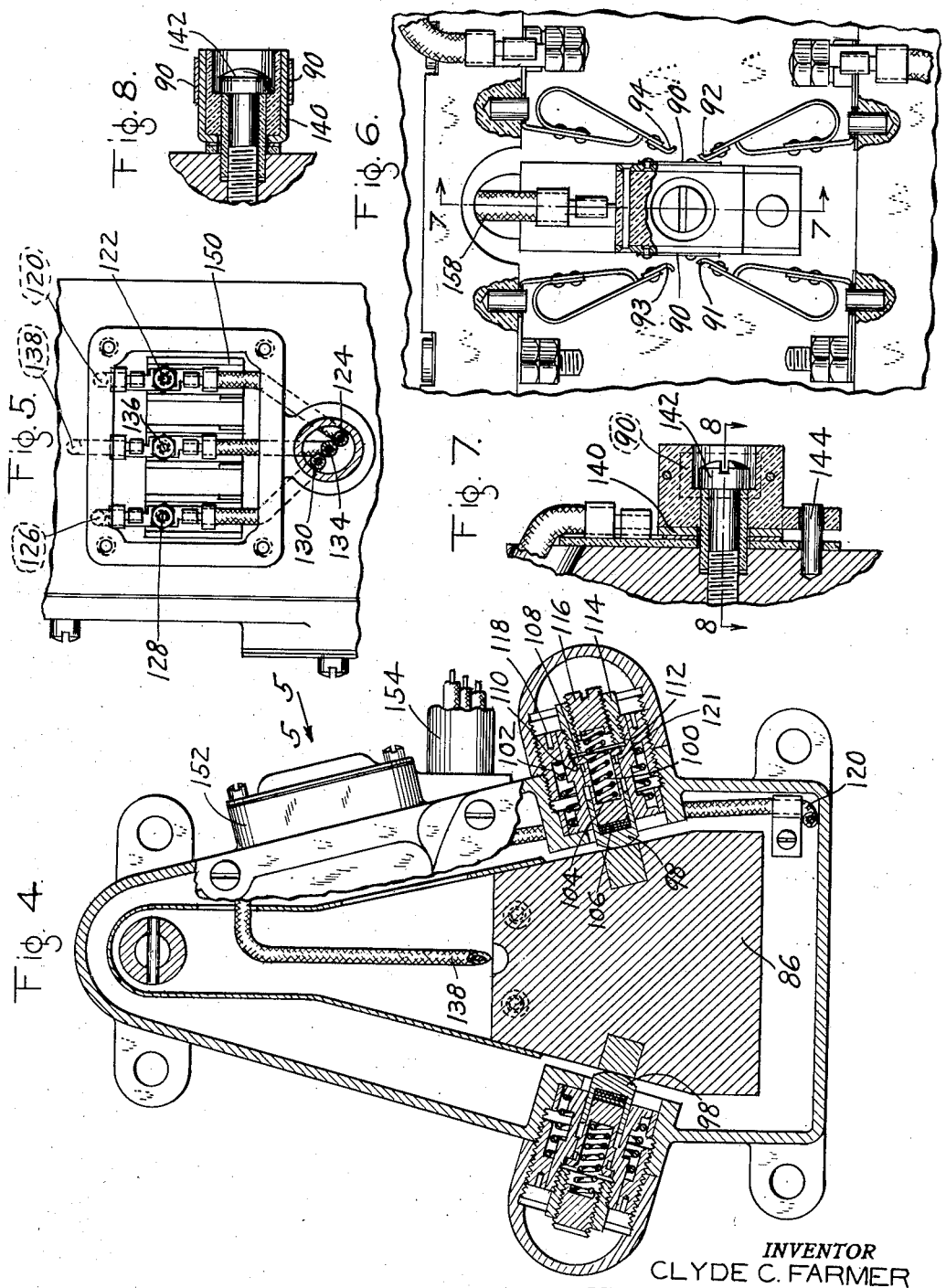
INVENTOR
CLYDE C. FARMER
BY Wm. M. Cady
ATTORNEY May 25, 1937.   C. C. FARMER   2,081,662
RAILWAY VEHICLE CONTROL APPARATUS
Filed Jan. 23, 1934   4 Sheets-Sheet 4

INVENTOR
CLYDE C. FARMER
BY Wm. M. Cady
ATTORNEY

Patented May 25, 1937

2,081,662

UNITED STATES PATENT OFFICE 2,081,662

RAILWAY VEHICLE CONTROL APPARATUS

Clyde C. Farmer, Pittsburgh, Pa., assignor to The Westinghouse Air Brake Company, Wilmerding, Pa., a corporation of Pennsylvania Application January 23, 1934, Serial No. 707,918

15 Claims. (Cl. 303—24)

This invention relates to railway vehicle control apparatus, and more specifically to apparatus for controlling the speed changes of railway vehicles.

In the operation of railway trains, or traction vehicles, it is highly desirable in the interest of conservation of time, that the train or vehicle be both accelerated and decelerated in the shortest possible time, without sliding of the wheels. While both of these functions may be accomplished manually, they are more effectively accomplished by some form of automatic control means, so that starts and stops may be made uniformly and independently of the skill of an operator. It is a principal object of my invention to provide apparatus responsive to speed changes for controlling both the acceleration and deceleration of a vehicle, or a railway train, so that starts and stops may be made automatically under the control of the apparatus and in the shortest possible time.

It is another object of my invention to provide a control device having a member responsive to changes in the rate of speed, for operating contacts which are adapted to control either the operation of the driving motors or the operation of an electropneumatic brake equipment, or both.

A still further object of my invention is to provide a retardation controller apparatus, in which an application of the brakes is initiated by operation of the usual brake valve device, and the brakes thereafter automatically controlled by the retardation controller apparatus.

Yet further objects and advantages of my invention will be apparent from the following description, which I have illustrated in several views in the attached drawings, wherein, Fig. 1 is a schematic arrangement of an embodiment of my invention, specifically adapted to control the braking of a vehicle.

Fig. 2 is an elevation of the control device shown in Fig. 1, with the outer plates removed to more clearly show the inner parts.

Fig. 3 is a view along the line 3—3 of Fig. 2.

Fig. 4 is a view along the line 4—4 of Fig. 3.

Fig. 5 is a view of the terminal board on the control device, looking along the arrow 5—5 of Fig. 4.

Fig. 6 is an enlarged elevation showing the contact arrangement of the control device.

Fig. 7 is a view along the line 7—7 of Fig. 6.

Fig. 8 is a view along the line 8—8 of Fig. 7.

Figure 9:
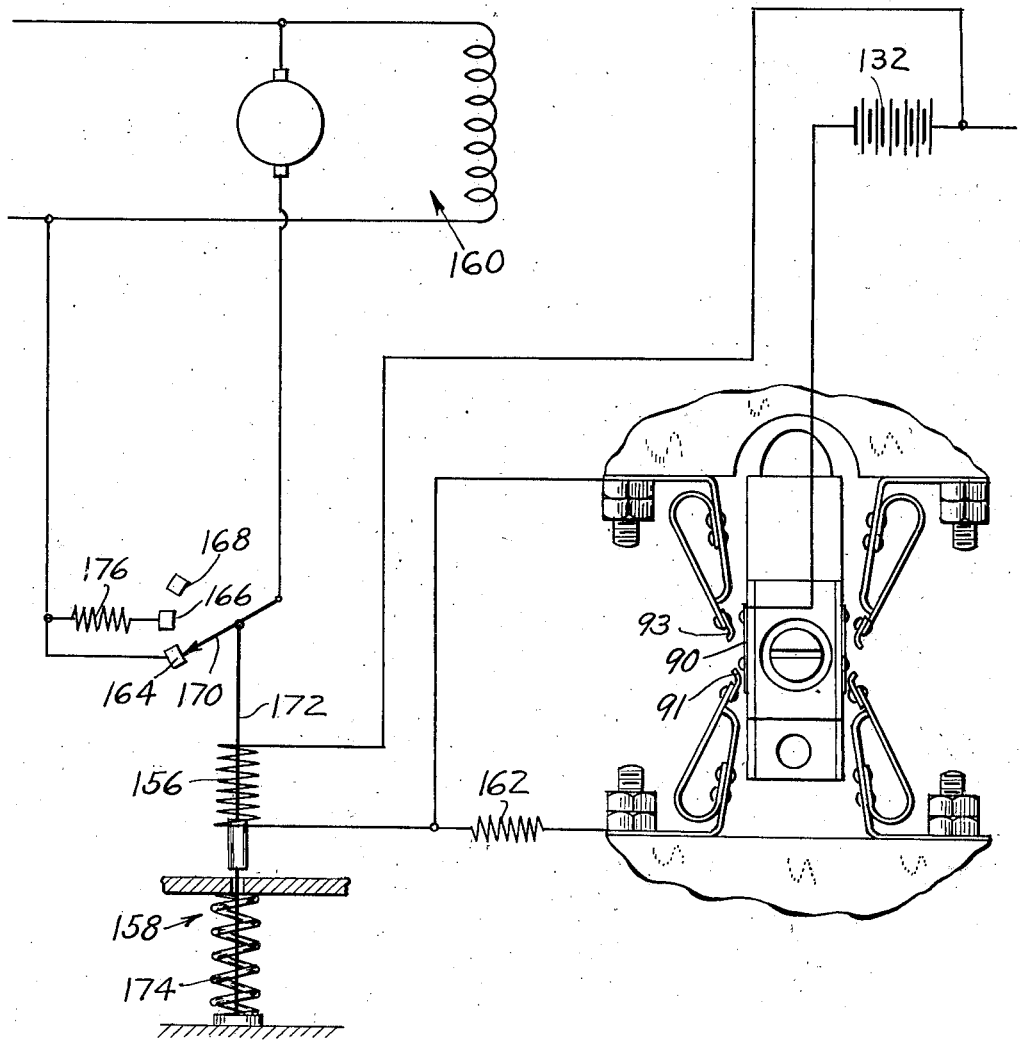
Fig. 9 shows in schematic form another adaptation of my invention, for controlling the acceleration of a vehicle.

Referring now to the drawings, and in particular to Fig. 1, I have for the embodiment there illustrated provided a brake valve device 10 and a brake controlling valve device 12, for controlling the supply of fluid under pressure to and its release from a brake cylinder 14. For controlling certain operations of the brake controlling valve device 12, I have provided a control device 16.

The brake valve device 10 may be of any of the usual types, as for example, a rotary type having the usual release, application and lap positions. It is, therefore, not considered necessary to describe in detail this brake valve device.

The brake controlling valve device 12 comprises a supply magnet valve section 18, a release magnet valve section 20, an inshot valve section 22, and a safety valve device 24 secured to the inshot valve section 22.

The supply magnet valve section 18 comprises a casing provided with a valve chamber 26, having constant communication with the brake cylinder 14 by passage 28 and pipe 30, and having disposed therein a double beat valve 32 secured to a valve stem 34. The double beat valve 32 is urged toward an upper seat 36 by a spring 38 acting upon a plunger 40 in engagement with the valve stem 34, so that when the valve is against the upper seat fluid under pressure may flow from a reservoir 42 through the brake valve device 10, pipe and passage 44, past an open lower seat 46 to the valve chamber 26 and from thence to the brake cylinder 14 through passage 28 and pipe 30. The double beat valve is urged to its lower seat 46 by an electro-magnet (not shown) in the upper portion of the casing, which when energized forces a plunger 48 downwardly to urge the double beat valve to its lower seated position, and thereby cut off the supply of fluid under pressure to the brake cylinder 14.

The release magnet valve section 20 comprises a casing defining a valve chamber 50 having constant communication with the brake cylinder 14 by way of passage 52 and pipe 30, and having disposed therein a valve 54 which cooperates with a seat 56 to control the release of fluid pressure from the brake cylinder 14 to the atmosphere by way of a chamber 57, passage 58 and the safety valve device 24. The valve 54 is urged toward seated position by a spring 60, and to unseated position by an electro-magnet (not shown) in the upper part of the casing, which when energized moves a plunger 62 downwardly into engagement with valve stem 64 to unseat the valve 54.

The inshot valve device section 22 comprises a casing defining a valve chamber 66 having communication with the reservoir 42 by way of passage 68, pipe 44, and brake valve device 10. Disposed in the valve chamber 66 is a ball valve 70, which is adapted to be engaged by a stem 72 associated with a piston 74 operatively mounted in a chamber 76 having constant communication with the atmosphere by way of a passage 78. The ball valve 70 is urged to unseated position by a spring 80 acting to urge the piston 74 upwardly against stops 82, and when in unseated position fluid under pressure may flow from the chamber 66, under the reservoir 42, to the brake cylinder 14 by way of passage 84 and pipe 30.

The resistance of the spring 80 is such that when a predetermined or chosen pressure has been built up in the brake cylinder 14, this pressure manifests itself on the upper side of the piston 74 to compress the spring 80 until the ball valve 70 is seated, whereupon the flow of fluid under pressure from the chamber 66 to the brake cylinder is cut off. The purpose of this will hereinafter more fully appear.

The safety valve device 24 is preferably of the type commonly used in connection with fluid pressure brake equipment, and it is, therefore, considered unnecessary to describe this device in detail.

The control device 16 is provided with a weighted body 86 suspended from a pivot 88 and carrying contacts 90 adapted to successively engage contacts 92 and 94, or contacts 91 and 93, supported from the housing 96 enclosing the device, for the purpose of controlling apparatus as hereinafter referred to.

The control device is adapted to be secured to a vehicle by lugs 97 in a manner such that when the vehicle is on a true horizontal track or roadway, the body is in a balanced position with the stationary contacts 91, 92, 93 and 94 spaced therefrom desired distances.

The body 86, which swings as a pendulum about the pivot 88, is normally held in a balanced position by spring-pressed plunger 98, and is adapted to be moved against opposition of one of the plungers when acted upon by force of inertia, as during a change in the rate of speed of the vehicle.

Initial or short movements of either of the plungers 98 are opposed by a light spring 100, while larger movements are opposed by a heavier spring 102. The light spring 100 is disposed in a sleeve member 104 slidably interfitting with the plunger 98 and having adjusting shims 106 disposed therebetween for the purpose of adjusting contact between the plunger and the body 86. The sleeve member 104 is provided with a flange 108 which is urged by spring 100 against a coacting shoulder 110 of an outer sleeve 112, a limited movement of the sleeve 104 being provided for between this shoulder and an adjustable stop 114. Tension of the spring 100 is regulated by an adjusting stud or screw 116.

When the body 86 moves against opposition of one of the spring compressed plungers 98, the light spring 100 is compressed until the flange 108 engages the stop 114, whereupon further movement of the plunger moves the outer sleeve 112 against resistance of the heavy spring 102. Tension on the heavy spring 102 is regulated by an adjusting member 118.

In order to reduce the friction surface between the sleeve member 104 and the outer sleeve member 112, I have diminished the outer surface of sleeve member 104 by cutting an annular slot 121 therein.

When the body 86 is held in balanced position by the spring-pressed plungers 98, contacts 91 to 94 will be out of engagement with the contacts 90 carried by the body, and when the body is caused to move to the right, as viewed in Fig. 2, one of the contacts 90 will engage contact 92 first and contact 94 subsequently. When the body moves to the left, a contact 90 will engage contact 91 first and contact 93 thereafter.

Now since the initial movement of the body 86 is opposed by the light spring 100 and subsequent movement by the spring 102, it will be apparent that a relatively small force of inertia will move the body 86 until the light spring is compressed, and thereafter a relatively large force of inertia is required to move the body until the heavy spring is compressed. Further, since the force of inertia acting to move the body 86 is proportional to the rate of speed change of the vehicle, the springs 100 and 102 may be adjusted so that, assuming the vehicle to be either accelerating or decelerating, a given rate of speed change will cause one of the movable contacts carried by the body 86 to engage the first stationary contact, and another rate of speed change will cause engagement with the second contact.

For controlling certain operations of the brake controlling valve device 12, contact 92 is connected to one side of the electro-magnet associated with the supply magnet valve section 18, by a conductor 120, terminal 122, and conductor 124, while the contact 94 is connected to one side of the electro-magnet associated with the release magnet valve section 20, by conductor 126, terminal 128, and conductor 130. The other side of the two electro-magnets is connected to one side of a source of current supply, such for example as a battery 132. The other side of the battery 132 is connected to the movable contacts 90 by conductor 134, terminal 136, and conductor 138.

It will, therefore, be seen that when a movable contact 90 engages the contact 92, by movement of the body 86 to the right, the supply valve 32 is caused to be seated, and when the movable contacts 90 engages the contact 94, the release valve 54 is caused to be unseated.

For the purpose of providing a reliable construction the contact 90 may be secured to a channel shaped supporting member 140, which is insulated from and secured to the body 86, as by a screw 142, in the manner shown in Figs. 7 and 8, a pin 144 being provided to prevent turning of the assembled structure.

The contacts 91, 92, 93 and 94 may be of like construction and are preferably supported from an insulating member 146 at the top and an insulating member 148 at the bottom. The contacts 91, 92, 93 and 94 are preferably carried by some form of resilient means, such for example as the spring elements shown.

While any means may be employed for providing connections between the contacts 90, 91, 92, 93 and 94 and external circuits leading to controlled devices, I prefer to supply a terminal board arrangement such as that shown in Fig. 5, wherein the terminals 122, 128 and 136 are supported on and secured to an insulating terminal board 150. A suitable housing 152 may be provided for enclosing this arrangement. The conductors 124, 130 and 134, leading to the external devices, may be brought to the terminal board through a conduit 154.

In operation of the embodiment shown in Fig. 1, when it is desired to effect an application of the brakes, the handle of the brake valve device 10 is moved to application position, whereupon fluid under pressure flows from the reservoir 42 to the brake cylinder 14 by way of pipe 44, passage 68, past the unseated ball valve 70, and through passage 84 and pipe 30.

At the same time, fluid under pressure will also flow to the brake cylinder through pipe and passage 44, past the unseated valve 32, and through passage 28 and pipe 30. The supply of fluid to the brake cylinder will, therefore, be effected at a maximum rate.

When the fluid pressure in the brake cylinder has built up to a predetermined or chosen value, it will act upon the piston 74 to move it downwardly against resistance of the spring 80 until the ball valve 70 is seated. Fluid will thereafter flow to the brake cylinder only past the unseated supply valve 32, and consequently at a slower rate. It will, therefore, be seen that in effecting an application of the brakes fluid initially flows to the brake cylinder at a maximum rate, and immediately thereafter the inshot valve device acts to reduce the rate. The inshot valve device also serves to insure a predetermined brake application in case valve 32 should be accidentally closed.

Assuming the direction of travel to be to the right, as viewed in Fig. 1, as the vehicle begins to decelerate with the application of the brakes, force of inertia will act upon the body 86 of the retardation controller device, to move it to the right against opposition of the light spring 100, to cause engagement of the movable contact 90 with the stationary contact 92. The electromagnet of the supply magnet valve section 18 will, therefore, be energized and the valve 32 will as a consequence be seated. The supply of fluid under pressure to the brake cylinder will, therefore, be cut off at a rate of retardation corresponding to that which will cause the body 86 to move far enough to bring contacts 90 and 92 into engagement. With the supply valve 32 seated, the supply of fluid to the brake cylinder will be lapped.

As the speed of the vehicle diminishes, the coefficient of friction between the rubbing parts of the brakes will increase, so that the rate of retardation will increase. With increased rate of retardation the body 86 of the retardation controller device will be caused to move further to the right, against resistance of the heavy spring 102. If the rate of retardation is sufficient to cause engagement of contact 90 with contact 94, the electro-magnet of the release magnet valve section 20 will be energized, and the release valve 54 will thereby be unseated. Fluid pressure in the brake cylinder will, therefore, be released to the atmosphere through the safety valve device 24. The safety valve device acts in the well known manner to prevent entire release of the fluid pressure in the brake cylinder.

If the release of pressure in the brake cylinder causes the desired decrease in rate of retardation, the body 86 will move to the left, whereupon its contact 90 will disengage from the contact 94 and the release valve 54 will be seated. The brakes will therefore, again be lapped.

If the release of fluid pressure from the brake cylinder has been more than was necessary to effect the desired rate of retardation, the body 86 will move toward its balanced position and disengage contact 90 from contact 92, whereupon the supply valve 32 will be unseated and fluid under pressure will again flow to the brake cylinder.

If, however, the body 86 moves only enough to disengage contact 90 from contact 94, but holds contact 90 in engagement with contact 92, then as the speed of the vehicle diminishes and the coefficient of friction between the rubbing parts of the brake increases, the rate of retardation will again increase and the body will again move to the right. A further release of fluid under pressure will, therefore, be effected, and this will continue intermittently, to maintain the desired rate of retardation, which is determined by the adjustment of the springs 100 and 102.

As the vehicle nears a stop, the rate of retardation will tend to increase rapidly, due to the rapid increase in coefficient of friction between the rubbing parts. A smooth stop may be effected, however, since further control of the brakes may be effected by manipulation of the brake valve device 10.

It will, therefore, be seen that the apparatus shown and described will operate to maintain a substantially constant rate of retardation, and at all times provides for control of the brakes by manual operation of the brake valve device.

If now contacts 91 and 92 are connected together, and likewise for contacts 93 and 94, then obviously the springs 100 and 102 for both plungers 98 may be similarly adjusted so that the brakes may be controlled by the control device for both directions of travel.

If, however, it is desired to control both acceleration and deceleration of a vehicle, or train, contacts 91 and 93 may be connected to acceleration control apparatus as shown in Fig. 9. As there shown, contacts 91 and 93 are connected to a winding 156 of a relay 158 adapted to control a motor 160 for operating an accelerating sequence switch.

Contact 91 is connected to the winding 156 through a resistance device 162, while contact 93 is connected directly to the same terminal of the winding. The other terminal of the winding is connected to the aforementioned battery 132, which, as before described, has an opposite terminal connected to the contacts 90. Contacts 92 and 94 are assumed to be connected as before described.

The relay 158 is provided with active contacts 164 and 166, and dummy contact 168, adapted to be engaged by a movable contact 170 actuated by a plunger 172 operated when winding 156 is energized. A spring 174 acts to urge the movable contact 170 downwardly toward a fixed engagement with the contact 164.

When accelerating a vehicle, the motor is initially energized through contacts 164 and 170 to drive a sequence switch, which is usually of the drum type, to accelerate the vehicle at some predetermined rate. As the vehicle accelerates, the body 86 of the control device swings to the left, causing contact 90 to engage contact 91. Relay winding 156 is thereby energized through the resistance device 162.

Energization of winding 156 exerts an upward pull on the plunger 172 against opposition of spring 174. Spring 174 is designed to permit an upward movement of the plunger under this pull far enough for movable contact 170 to engage contact 166, whereupon a resistance device 176 is connected in series with the armature of the motor 160, causing it to drive the sequence switch at a lower speed.

If the rate of acceleration is still greater than that desired, as determined by the adjustment of springs 100 and 102, the body 86 moves further to the left to cause contact 90 to engage contact 93, whereupon relay winding 156 is energized to a greater degree, moving contact 170 out of engagement with contact 166 and into engagement with dummy contact 168. The motor 160 is thereby deenergized and progressive acceleration stopped.

Upon a decrease in the rate of acceleration below that desired, the body 86 will move toward balanced position to either re-energize the motor through the resistance device 176 or direct. Thereafter the body will operate the relay 158 through contacts 91 and 93 as required to maintain the preselected rate of acceleration.

When connecting the control device 16 for controlling both acceleration and deceleration, the terminal board 150 may be replaced by one having additional terminals for the additional conductors.

While I have shown and described several embodiments of my invention, it is to be understood that it is not my intention to limit its scope to these embodiments or otherwise than by the terms of the appended claims.

Having now described my invention, what I claim as new and desire to secure by Letters Patent, is:

1. A vehicle control device comprising a suspended body, a contact carried by said body, stationary contacts adapted to be engaged by said first contact when said body is moved, a plurality of springs opposing movement of said body, and means whereby a force of inertia acting upon said body causes it to move to compress one of said springs and to thereafter cause said first contact to engage one of said stationary contacts, and means whereby another force of inertia acting upon said body causes it to compress another of said springs to thereafter cause said first contact to engage another of said stationary contacts.

2. A control device for vehicles comprising, in combination, a body adapted to be moved in response to speed changes of the vehicle, a first spring for opposing movement of said body through a first distance, a second spring for opposing movement of said body through a second distance following movement through said first distance, means whereby said second spring only is effective during movement of said body through said second distance, and means for adjusting the tension on said first spring to vary what rate of speed change is required to move said body through said first distance.

3. A control device for vehicles comprising, in combination, a body adapted to be moved in response to speed changes of the vehicle, a plunger engaging said body, a first spring acting upon said plunger and adapted to be compressed when said body moves through a first distance, and a second spring adapted to be compressed through action of said plunger without increasing the tension on said first spring when said body moves through a second distance.

4. A control device for vehicles comprising, in combination, a body adapted to be moved in response to speed changes of the vehicle, resilient means for opposing movement of said body through a first distance, a second resilient means, and means whereby said second resilient means only opposes movement of said body beyond said first distance.

5. In a control device for vehicles, in combination, a body adapted to be moved according to the rate of speed change of the vehicle, a first resilient means for opposing movement of said body, a second resilient means for also opposing movement of said body, and means whereby one only of said two resilient means opposes movement of said body through a predetermined distance and then the other only of said two resilient means opposes movement of said body thereafter.

6. In a control device for vehicles, in combination, a body adapted to be moved according to the rate of speed change of the vehicle, a first spring for opposing movement of said body, a second spring concentrically disposed with respect to said first spring for also opposing movement of said body, an element associated with said first spring and adapted to be moved when said first spring is compressed, and a second and separate element associated with said second spring and adapted to be engaged by and upon a predetermined movement of said first element for rendering said second spring only thereafter effective in opposing movement of said body.

7. In a vehicle control device, in combination, an inertia responsive member adapted to be moved in either of two directions in response to speed changes of the vehicle, a spring mechanism for opposing movement of said member in either direction, said spring mechanism comprising a first spring for opposing movement of said member through a first distance only and a second spring rendered effective in opposing movement of said member through a second distance only.

8. In a vehicle control device, in combination, a pendulum adapted to be swung in either of two directions in response to speed changes of the vehicle, a spring mechanism for opposing movement of said pendulum in either direction, said spring mechanism comprising a first spring for opposing movement of said body through a first distance only and a second spring rendered effective in opposing movement of said body through a second distance only, said springs being concentrically disposed with respect to each other, and means for adjusting the tension on one of said two springs.

9. In a vehicle brake system, in combination, brake means, means for effecting an application of said brake means, a body adapted to be moved according to the rate of retardation of the vehicle, a first resilient means for opposing movement of said body, a second resilient means for also opposing movement of said body, means whereby said first resilient means only is effective in opposing movement of said body below a selected rate of retardation and said second resilient means only is effective in opposing movement of said body above said selected rate of retardation, and means for controlling the degree of application of said brake means according to whether or not one or the other of said two resilient means is effective in opposing movement of said body.

10. In a vehicle brake system, in combination, brake means, means for effecting an application of said brake means, a body adapted to be moved according to the rate of retardation of the vehicle, a first spring for opposing movement of said body, means for adjusting the tension on said first spring, a second spring adapted to also oppose movement of said body when said first spring has been compressed to a predetermined degree, said first spring being compressed to said predetermined degree when said body has been moved in response to a rate of retardation determined by the tension placed on said first spring, means for limiting the degree of application of said brake means when said first spring has been compressed to said predetermined degree, and means for reducing the degree of application of said brake means when said second spring has been compressed to a chosen degree, the compression of said second spring to said chosen degree being constant regardless of the tension placed on said first spring by said adjusting means.

11. A control device comprising, in combination, a body adapted to be moved under a force of inertia, a first resilient means for opposing movement of said body through a first distance, a second resilient means for opposing movement of said body through a second distance, a plurality of contacts, and means whereby one of said contacts is operated only when said body has compressed said first resilient means in moving through said first distance, and the other of said contacts is operated only when said body has compressed said second resilient means in moving through said second distance.

12. In a control device, in combination, a body adapted to be moved under a force of inertia, a first spring for opposing movement of said body, means for adjusting the tension on said first spring, a second spring for opposing movement of said body, means whereby said first spring is effective in opposing movement of said body through a first distance, and then said second spring only is effective in opposing movement of said body through a second distance, a contact adapted to be operated when said body has moved through said first distance, and a second contact adapted to be operated when said body has moved through said second distance.

13. In a vehicle control device, in combination, a body adapted to be moved according to the rate of speed change of the vehicle, resilient means opposing movement of said body through a first distance, a second resilient means for opposing movement of said body through a second distance, a first contact adapted to be operated when said body moves through said first distance, a second contact adapted to be operated when said body moves through said second distance, and means for adjusting the opposition offered by said first resilient means whereby different rates of speed change are required to move said body through said first distance, said means being arranged such that the increment of speed change required to move said body through said second distance is the same regardless of the speed change required to move said body through said first distance.

14. In a vehicle control apparatus, the combination with a brake cylinder, of electroresponsive supply means for controlling the supply of fluid under pressure to said brake cylinder, electroresponsive release means for controlling the release of fluid under pressure from said brake cylinder, a pendulum adapted to be moved according to the rate of deceleration of the vehicle, a contact carried by said pendulum, two contacts disposed in the path of movement of said pendulum and adapted to be engaged successively by said first contact, a source of current supply, a circuit for connecting said source to said first contact, a second circuit for connecting one of said two contacts to said electroresponsive supply means, and a third circuit for connecting the other of said two contacts to said electroresponsive release means, whereby engagement of said first contact with said two contacts successively energizes said electroresponsive means.

15. In a vehicle control apparatus, the combination with a brake cylinder, of a pendulum device adapted to be moved according to the rate of deceleration of the vehicle, a contact carried by said pendulum, two stationary contacts disposed in the path of movement of said pendulum and adapted to be engaged successively by said first contact, means operated upon engagement of said first contact with one of said stationary contacts for cutting off the supply of fluid under pressure to said brake cylinder, and means operated upon engagement of said first contact with the other of said stationary contacts for effecting a release of fluid under pressure from said brake cylinder.

CLYDE C. FARMER.